US012769706B2

(12) United States Patent
Tan et al.

(10) Patent No.: US 12,769,706 B2
(45) Date of Patent: Oct. 20, 2026

(54) NEAR MEMORY PROCESSING DEVICE, PROCESSOR AND DATA PROCESSING METHOD

(71) Applicant: SAMSUNG ELECTRONICS CO., LTD., Suwon-si (KR)

(72) Inventors: Ran Tan, Suwon-si (KR); Bumjun Kim, Suwon-si (KR); Kyungkeun Lee, Suwon-si (KR); Ning Li, Suwon-si (KR); Nannan Zhang, Suwon-si (KR); Zhigong Liang, Suwon-si (KR); Heng Liu, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 19/213,127

(22) Filed: May 20, 2025

(65) Prior Publication Data

US 2026/0211849 A1 Jul. 23, 2026

(30) Foreign Application Priority Data

Jan. 20, 2025 (CN) ......................... 202510089018.1

(51) Int. Cl.
*G06F 16/00* (2019.01)
*G06F 16/14* (2019.01)
*G06F 16/174* (2019.01)

(52) U.S. Cl.
CPC ........ *G06F 16/1748* (2019.01); *G06F 16/152* (2019.01)

(58) Field of Classification Search
CPC ........................... G06F 16/1748; G06F 16/152
See application file for complete search history.

(56) References Cited

U.S. PATENT DOCUMENTS

| | | | | |
|---|---|---|---|---|
| 11,232,065 | B2 | 1/2022 | Bansod et al. | |
| 11,609,702 | B2 | 3/2023 | R et al. | |
| 12,045,199 | B1 | 7/2024 | Sorenson, III et al. | |
| 12,119,836 | B2 * | 10/2024 | Kesavan | G06F 3/0653 |
| 2023/0376460 | A1 * | 11/2023 | Maybee | G06F 3/0607 |

FOREIGN PATENT DOCUMENTS

| | | |
|---|---|---|
| CN | 108363727 A | 8/2018 |
| CN | 115543224 A | 12/2022 |

* cited by examiner

*Primary Examiner* — Paul Kim
(74) *Attorney, Agent, or Firm* — Sughrue Mion, PLLC

(57) ABSTRACT

A near memory processing device, a processor and a data processing method are provided. The near memory processing device includes a memory, and a calculation core. The calculation core includes a block trace core that determines an address of a first target data block from the memory based on receiving an indirect block parse request from a processor, and calculates a checksum of a second target data block and write the calculated checksum to the memory based on receiving a checksum update request from the processor, a deduplication table search core that performs deduplication table search processing based on receiving a deduplication table query request from the processor to determine whether a third target data block exists in the memory, and a tree traverse core that traverses a range tree in the memory based on receiving a range tree query request from the processor to determine a target node corresponding to the range tree query request.

20 Claims, 9 Drawing Sheets

NEAR MEMORY PROCESSING DEVICE, PROCESSOR AND DATA PROCESSING METHOD

CROSS-REFERENCE TO RELATED APPLICATION

This application is based on and claims priority under 35 USC § 119 to Chinese Patent Application No. 202510089018.1 filed on Jan. 20, 2025, in the China National Intellectual Property Administration, the contents of which being incorporated by reference herein in their entirety.

BACKGROUND

The disclosure relates to the technical field of memory, more particularly to a near memory processing device, a processor and a data processing method.

A Zettabyte file system (ZFS) file system is a next generation of advanced open source file system, which has excellent characteristics such as unlimited extendibility, rich functionality, and high integrity, etc.

Recently, a surge in global data volume is stimulating the growth capacity of storage devices, and solid-state drives (SSDs) with a single block capacity of 30 TB~60 TB and petabyte (PB) level single node storage servers are beginning to appear in the market. Therefore, managing PB level data volumes will be a huge challenge for file systems.

For example, the file systems may operate by using a portion of the storage space to store file system metadata. Moreover, for PB level user file data, terabyte (TB) level metadata needs to be stored. The ZFS file system adopts an Adjustable Replacement Cache (ARC) mechanism to automatically cache hotspot metadata in a memory. In this case, the larger the allocated memory, the better the performance of the ZFS file system.

The ZFS file system accesses metadata such as an index node (dnode), a deduplication table (DDT), a space map and the like every time a file is read or written. However, in a case in which there is not enough memory to store the metadata, the metadata will be obtained through an IO (input/output), which is inefficient. In addition, in processing the metadata, there are many memory access intensive calculations that result in massive amounts of data moving between a CPU and a memory.

SUMMARY

The disclosure provides a near memory processing device, a processor, and a data processing method that can reduce IO operations for loading metadata from a storage device, reduce a large amount of data interaction between a CPU and a memory, and improve a performance of a ZFS file system in a massive storage scenario.

According to an aspect of the disclosure, there is provided a near memory processing device, including: a memory and a calculation core including: a block trace core configured to determine an address of a first target data block from the memory based on receiving an indirect block parse request from a processor, and calculate a checksum of a second target data block and write the calculated checksum to the memory based on receiving a checksum update request from the processor, a deduplication table search core configured to perform deduplication table search processing based on receiving a deduplication table query request from the processor to determine whether a third target data block exists in the memory, and a tree traverse core configured to traverse a range tree in the memory based on receiving a range tree query request from the processor to determine a target node corresponding to the range tree query request.

The memory may store metadata of a ZFS file system, and the metadata of the ZFS file system may include an index node (dnode), a deduplication table (DDT) and a space map, wherein the index node is linked to a plurality of data blocks through multi-level indirect blocks in the memory, wherein the range tree is generated in the memory based on the space map.

The multi-level indirect blocks may include N-level indirect blocks, where Nis an integer greater than 1, and a i-th level indirect block, among the N-level indirect blocks, may include a plurality of blocks, where i is an integer greater than or equal to 1 and less than N, each block in a j-th level indirect block, among the N-level indirect blocks, may include a block pointer pointing to a corresponding block in a j−1-th level indirect block, which may include an address and a checksum of the corresponding block in the j−1-th level indirect block, where j is an integer greater than 1 and less than or equal to N, each block in a first level indirect block, among the N-level indirect blocks, may include a block pointer pointing to a data block, which comprises an address and a checksum of the data block.

The block trace core may be configured to: based on receiving the indirect block parse request from the processor, load the block pointer pointing to a corresponding block in a next level indirect block, starting from the Nth level indirect block to the first level indirect block, among the N-level indirect blocks, based on an ID of the first target data block, and determine the address of the first target data block from the block pointer of the corresponding block in the first level indirect block, and return the address of the first target data block to the processor, wherein the indirect block parse request is generated based on an operation for reading or writing the first target data block, and wherein the indirect block parse request comprises the ID of the first target data block.

The block trace core may be configured to: based on receiving the checksum update request from the processor, load the second target data block from the memory, and calculate the checksum of the second target data block and write the calculated checksum to an indirect block stored in the memory, wherein the checksum update request is generated based on writing the second target data block.

The deduplication table search core may be configured to: based on receiving the deduplication table query request from the processor, calculate a first level hash value based on a fingerprint of the third target data block, based on the first level hash value, load a leaf node of the deduplication table from the memory, calculate a second level hash value based on the fingerprint of the third target data block, based on the second level hash value and the loaded leaf node of the deduplication table, load a deduplication table entry from the memory, and based on the fingerprint of the third target data block being equal to a key value of the loaded deduplication table entry, determine that the third target data block is stored in the memory, wherein the deduplication table query request is generated based on an operation for reading or writing the third target data block.

The block trace core may be configured to: based on receiving the range tree query request from the processor, read a current range tree node from the memory, based on the read current range tree node, perform binary search according to start and end addresses of space targeted by the range tree query request, based on finding a range tree node corresponding to the range tree query request through the binary search, determine the found range tree node as the target node corresponding to the range tree query request, and based on not finding the range tree node corresponding to the range tree query request through the binary search, read a next range tree node from the memory, use the read next range tree node as the current range tree node, and return to the operation of performing the binary search, wherein the range tree query request is generated based on an operation for reading or writing data.

According to another aspect of the disclosure, there is provided a processor, including: an index node management module configured to: generate an indirect block parse request based on an instruction to read or write a first target data block, and transmit the indirect block parse request to a near memory processing device; and generate a checksum update request based on an instruction to write a second target data block, and transmit the checksum update request to the near memory processing device, a deduplication table management module configured to: generate a deduplication table query request based on an instruction to read or write a third target data block, and transmit the deduplication table query request to the near memory processing device, and a space management module configured to: generate a range tree query request based on an instruction to read or write data, and transmit the range tree query request to the near memory processing device.

The index node management module may be further configured to: receive an address of the first target data block determined based on the indirect block parse request from the near memory processing device, or receive a result of calculating a checksum of the second target data block based on the checksum update request from the near memory processing device, the deduplication table management module may be further configured to: receive a result of determining whether the third target data block exists in the near memory processing device based on the deduplication table query request from the near memory processing device; and the space management module may be further configured to: receive a range tree node determined based on the range tree query request from the near memory processing device.

According to another aspect of the disclosure, there is provided a data processing method executed in a near memory processing device, including: determining an address of a first target data block from a memory based on receiving an indirect block parse request from a processor, and calculating a checksum of a second target data block and writing the calculated checksum to the memory based on receiving a checksum update request from the processor, performing deduplication table search processing based on receiving a deduplication table query request from the processor to determine whether a third target data block exists in the memory, and traversing a range tree in the memory based on receiving a range tree query request from the processor to determine a target node corresponding to the range tree query request.

According to another aspect of the disclosure, there is provided a data processing method executed by a processor, including: generating an indirect block parse request based on an instruction to read or write a first target data block, and transmitting the indirect block parse request to a near memory processing device; generating a checksum update request based on an instruction to write a second target data block, and transmitting the checksum update request to the near memory processing device, generating a deduplication table query request based on an instruction to read or write a third target data block, and transmitting the deduplication table query request to the near memory processing device, and generating a range tree query request based on an instruction to read or write data, and transmit the range tree query request to the near memory processing device.

According to another aspect of the disclosure, there is provided a computer-readable storage medium storing a computer program that, when executed by a processor, implements a data processing method including: determining an address of a first target data block from a memory based on receiving an indirect block parse request from a processor, and calculating a checksum of a second target data block and writing the calculated checksum to the memory based on receiving a checksum update request from the processor, performing deduplication table search processing based on receiving a deduplication table query request from the processor to determine whether a third target data block exists in the memory, and traversing a range tree in the memory based on receiving a range tree query request from the processor to determine a target node corresponding to the range tree query request.

According to another aspect of the disclosure, there is provided a host system including: a processor and a near memory processing device. The processor may be configured to generate an indirect block parse request based on an instruction to read or write a first target data block, and transmit the indirect block parse request to a near memory processing device, generate a checksum update request based on an instruction to write a second target data block, and transmit the checksum update request to the near memory processing device, generate a deduplication table query request based on an instruction to read or write a third target data block, and transmit the deduplication table query request to the near memory processing device, and generate a range tree query request based on an instruction to read or write data, and transmit the range tree query request to the near memory processing device. The near memory processing device may include a memory and a calculation core including: a block trace core configured to determine an address of a first target data block from the memory based on receiving the indirect block parse request from the processor, and calculate a checksum of a second target data block and write the calculated checksum to the memory based on receiving the checksum update request from the processor, a deduplication table search core configured to perform deduplication table search processing based on receiving the deduplication table query request from the processor to determine whether a third target data block exists in the memory, and a tree traverse core configured to traverse a range tree in the memory based on receiving the range tree query request from the processor to determine a target node corresponding to the range tree query request.

According to the near memory processing device, the processor, and the data processing method of the embodiments of the disclosure, more metadata can be cached, a cache hit rate of the metadata can be improved and IO operations for loading the metadata from a storage device can be reduced by expanding the memory capacity using the near memory processing device (e.g., a CMM-DC device). Meanwhile, it is possible to reduce a large amount of data interaction between the CPU and the memory by offloading memory access intensive calculation to the near memory processing device. In addition, according to the near memory processing device, processor, and data processing method of the embodiments of the disclosure, a solution for improving metadata management for PB level large capacity storage can be provided, thereby enhancing execution efficiency of the ZFS file system.

BRIEF DESCRIPTION OF DRAWINGS

The above and other objects, features and advantages of the disclosure will become more apparent from the following detailed description in conjunction with the attached drawings, in which.

DETAILED DESCRIPTION

Figure 1:
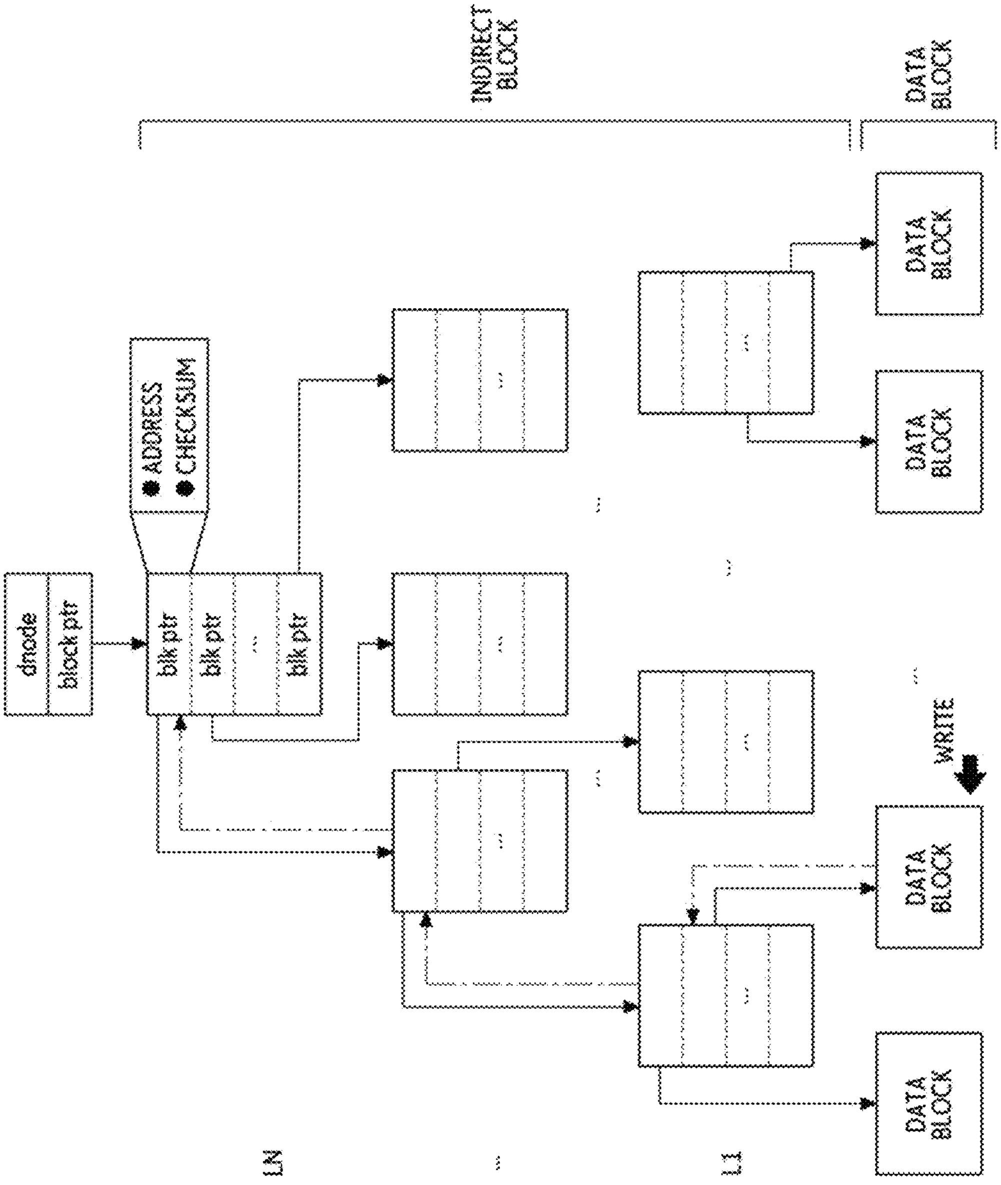
FIG. 1 is a diagram illustrating an example of an access process of an index node (dnode) of a ZFS file system.

Various embodiments of the disclosure will be described with reference to the accompanying drawings hereinafter, wherein the same reference numerals are used to represent the same or similar elements, features, and structures. However, the disclosure is not meant to be limited to specific embodiments by the various embodiments described herein, and is meant to: the disclosure covers all modifications, equivalents, and/or alternatives to the disclosure, as long as they are within the scope of the appended claims and their equivalents. The terms and words used in the following description and claims are not limited to their dictionary meanings, but are only used to enable a clear and consistent understanding of the disclosure. Thus, what is obvious to those skilled in the art is: the following descriptions of various embodiments provided in the disclosure is only for illustrative purposes and is not intended to limit the purpose of the disclosure as defined by the appended claims and their equivalents.

It should be understood that unless otherwise specified in the context, singular form includes plural form. The terms "include", "contain" and "have" used in the disclosure indicate the presence of disclosed functions, operations, or elements, but do not exclude other functions, operations, or elements.

For example, the expression "A or B" or "at least one of A and/or B" may indicate A and B, A or B. For example, the expression "A or B" or "at least one of A and/or B" may indicate (1) A, (2) B or (3) both of A and B.

In various embodiments of the disclosure, when a component (e.g., a first component) is referred to as "coupled" or "connected" with another component (e.g., a second component) or "coupled" or "connected" to another component (e.g., a second component), the component may be directly connected to the other component or may be connected through another component (e.g., a third component). On the other hand, when a component (e.g., a first component) is referred to as "directly coupled" or "directly connected" with another component (e.g., a second component) or "directly coupled" or "directly connected" to another component (e.g., a second component), there is no other component (e.g., a third component) between the component and the other component.

The expression "configured to" used in describing various embodiments of the disclosure may be interchangeably used with expressions such as "applicable", "capable of", "designed", "suitable", "manufactured", and "capable" depending on the situation. The term "configured to" may not necessarily indicate being "specifically designed for" according to hardware. On the contrary, the expression "a device configured to . . . " in some cases may indicate that the device and another device or part are "capable of . . . ". For example, the expression "a processor configured to perform A, B and C" may indicate a dedicated processor (e.g., an embedded processor) for performing corresponding operations or a general-purpose processor (e.g., a central processing unit (CPU) or an application processor (AP)) for performing corresponding operations by executing at least one software program stored in a storage device.

The terminology used in the disclosure is meant to describe certain embodiments of the disclosure, but is not meant to limit the scope of other embodiments. Unless otherwise specified in the disclosure, all terms used in the disclosure (including technical or scientific terms) may have the same meaning as commonly understood by a person skilled in the art. Generally, terms defined in a dictionary should be considered to have the same meaning as the context in the relevant field, and unless explicitly defined in the disclosure, they should not be interpreted differently or interpreted as having excessively formal meanings. In any case, the terms defined in the disclosure are not meant to be interpreted as excluding an embodiment of the disclosure either.

According to an embodiment, a metadata processing method of a Zettabyte file system (ZFS) system is described.

The ZFS file system accesses metadata every time a file is read or written. The metadata may include, but is not limited to, an index node (dnode), a deduplication table (DDT), a space map and the like.

FIG. 1 is a diagram illustrating an example of an access process of an index node (dnode) of a ZFS file system.

Referring to FIG. 1, the ZFS file system uses an index node (dnode) and multi-level indirect blocks linked to the dnode to manage files. For example, the ZFS file system use the index node (dnode) similar to an index node (inode) in the Linux operating system. For a file with N (N is an integer greater than 2) levels (L1 to LN levels) of indirect blocks, when accessing data blocks, it is necessary to access each indirect block from top to bottom along an access path and parse corresponding block pointers (block ptr) (a block trace procedure as illustrated by a solid arrow in FIG. 1). A checksum of a block is recorded in a block pointer located in a previous level block. Therefore, whenever one data block is modified, all its relevant indirect blocks must be updated in a chained manner (a checksum update process as illustrated by the dashed arrow in FIG. 1).

In the absence of the indirect blocks in a memory (e.g., the indirect block misses the memory), for the file with N-level indirect blocks, every time a user accesses (reads/writes) one data block, N storage device input/outputs (IOs) are generated and N block pointer parsing are generated (belonging to memory access intensive calculation). In addition, when writing (or modifying) one data block, an additional N+1 writing/modifying the checksum (belonging to memory access intensive calculation) will be generated.

Figure 2:
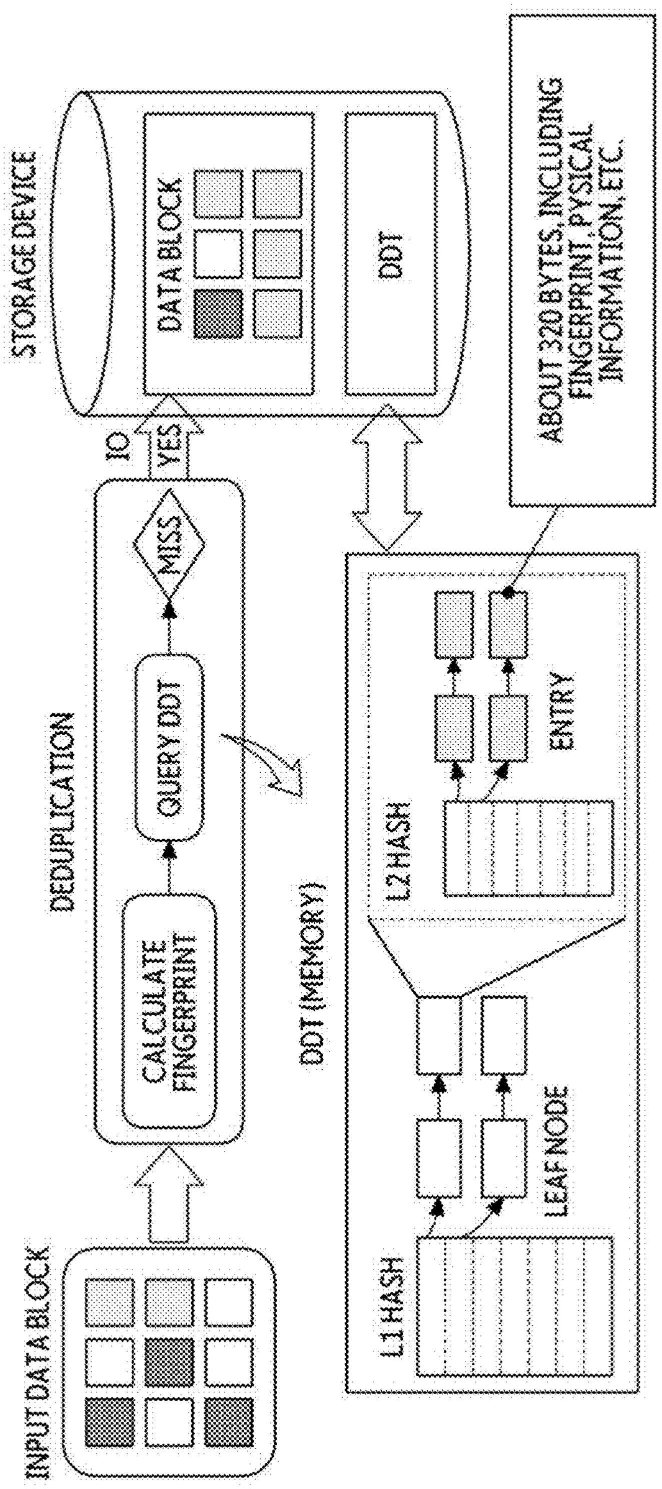
FIG. 2 is a diagram illustrating an example of a deduplication process of a ZFS file system.

FIG. 2 is a diagram illustrating an example of a deduplication process of a ZFS file system.

Referring to FIG. 2, the ZFS file system supports block level deduplication. Each data block corresponds to generating a fingerprint. In an example case in which the fingerprint hits a deduplication table (DDT), it will not trigger a storage device IO of a data block, which may greatly reduce storage space. However, cost of using the block level deduplication is the need for more memory to cache the DDT, otherwise IO operations accessing the DDT will degrade the performance of the ZFS file system.

As illustrated in FIG. 2, the DDT is a two-level hash table (L1 HASH and L2 HASH). For data with a repetition rate of 5 and a block size of 128 k, 1 TB of data requires 0.5 GB of DDT. In the absence of the DDT (e.g., the DDT misses the memory) in the memory, accessing each data block will result in a storage device IO and require a plurality of comparison calculations (belonging to memory access intensive calculation) at a same time.

Figure 3:
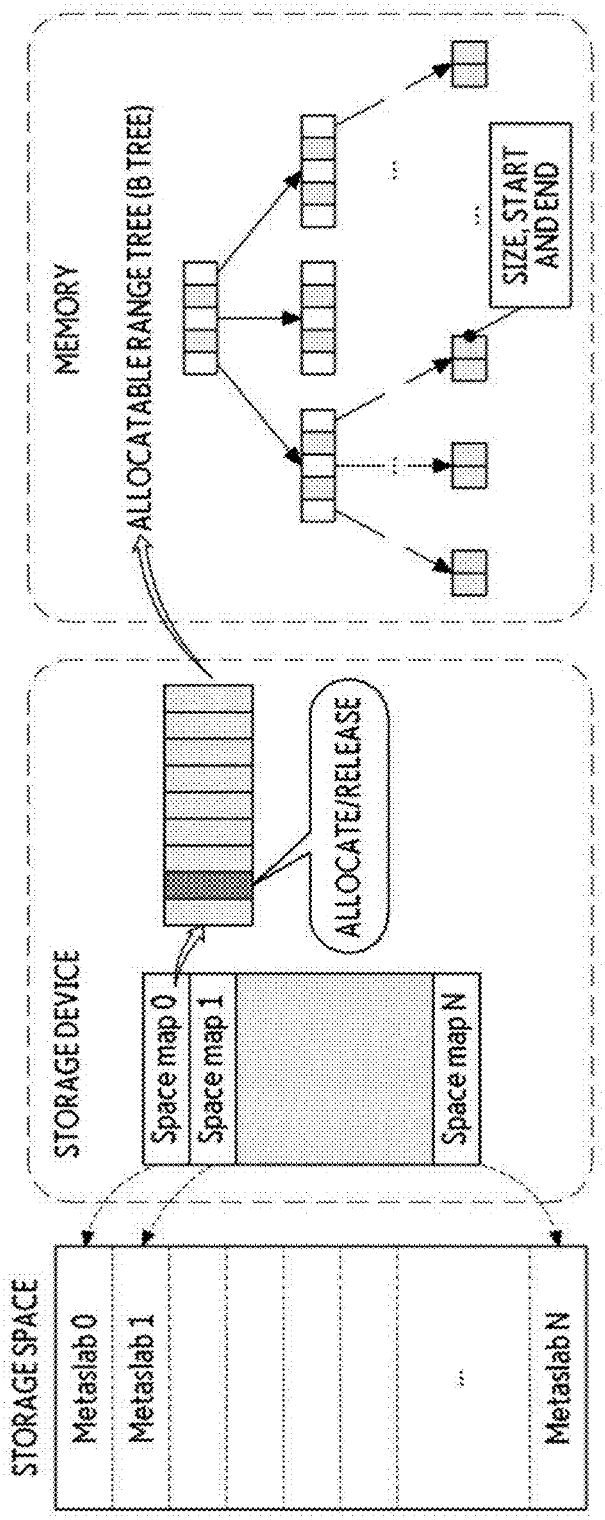
FIG. 3 is a diagram illustrating an example of a space management of a ZFS file system.

FIG. 3 is a diagram illustrating an example of a space management of a ZFS file system.

The ZFS file system divides a storage device into M equally sized segments (referred to as metaslabs), wherein M is an integer greater than 1. Each metaslab has a space map that records the allocation and release of space. In an example case in which a metaslab is selected as a space allocation object, a range tree of free space is generated in the memory based on the space map.

For TB level storage devices, a range tree of approximately 100 MB level is required in the memory. In the absence of the space map in the memory (e.g., the space map misses the memory), each time a data block is allocated, the space map needs to be read from the storage device, resulting in generating storage device IOs. Meanwhile, every time a data block is allocated, a search operation (belonging to memory access intensive calculation) is required to be performed on the range tree.

As illustrated in FIGS. 1, 2 and 3, the ZFS file system accesses the metadata such as the index node (dnode), the deduplication table (DDT), the space map and the like every time a file is read or written. In an example case in which there is not enough memory to store the metadata, the metadata will be obtained through the storage device IOs, which is inefficient. Therefore, unnecessary IOs may be reduced by expanding the memory capacity. In addition, in metadata processing, there are many memory access intensive calculations that result in massive amounts of data moving between a CPU and the memory. However, such memory access intensive calculations are simple, highly repetitive, and do not require the complex logical control. In an example case in which these memory intensive calculations are moved to the location close to the metadata, it can greatly reduce data movement between the CPU and the memory, which fundamentally improves efficiency.

Table 1 shows a number of times of IOs and memory access intensive calculations when accessing each data block in related technology.

TABLE 1

| | | Number of times of IOs | Number of times of the memory access intensive calculations | |
|---|---|---|---|---|
| Metadata type | Operation | for missing the memory | Calculation type | Order of magnitude for memory access |
| dnode | R/W (read/write) | N = dnode level number | Parse block pointer | N + 1 |
| | W (write) | | Checksum | N * (block size/page size) |
| DDT | R/W (read/write) | [1, DDT size/ block size] | Compare | [1, number of entries] |
| space map | R/W (read/write ) | [1, space map size/block size] | Position calculation Compare | Log(number of entries) * range tree height |

Near storage processing (also referred to as near memory processing) is a technology that integrates the memory and logic chips into advanced integrated circuit packaging, which utilizes the memory for data calculation and reduces data movement between the CPU and the memory. According to an embodiment, near memory processing may also be referred to as processing near memory (PNM).

Open standard CXL may be used in conjunction with a PNM device for easy expanding the memory capacity. In testing, a PNM solution based on a CXL interface has been proven to improve the performance of an application program (such as a recommendation system or a memory database that requires high memory bandwidth) by more than twice.

According to an embodiment of the disclosure, a near memory processing device, a processor and a data processing method are provided. The near memory processing device, processor and data processing method serve as a memory access intensive calculation acceleration solution for the ZFS file system, which can cache more metadata, reduce storage device IOs, significantly reduce data transfer between the CPU and the memory, release CPU computing resources, reduce CPU pressure, and ultimately improve the performance of the ZFS file system by offloading these calculations to the near memory processing device (such as a CMM-DC (CXL Memory Module-DRAM Compute, CXL Processor Module-DRAM Compute) device).

Figure 4:
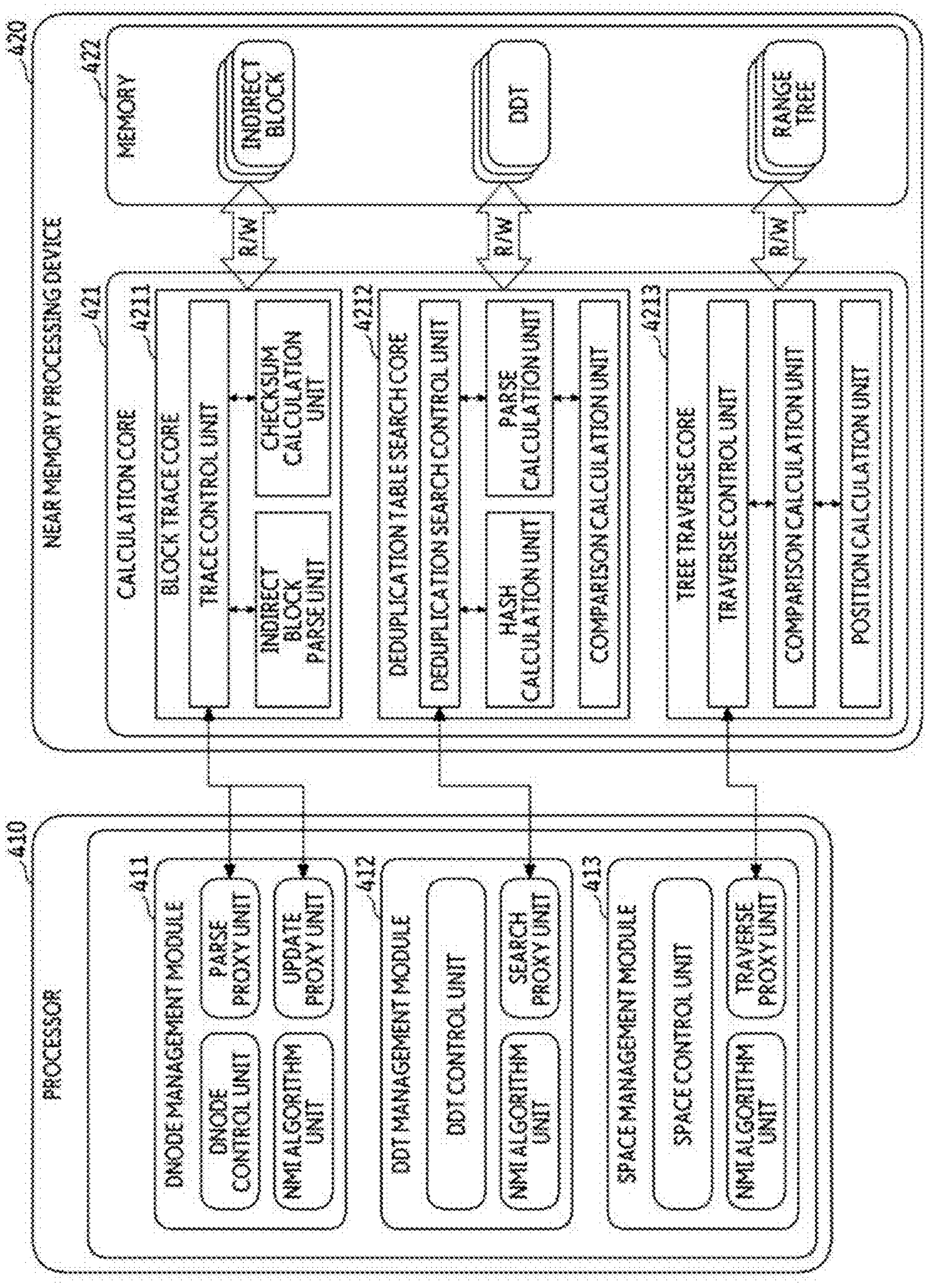
FIG. 4 is a diagram illustrating a framework of a host system according to an embodiment of the disclosure.

FIG. 4 is a diagram illustrating a framework of a host system of an embodiment of the disclosure.

Referring to FIG. 4, the host system may include a processor 410 and a near memory processing device 420. In addition, the host system may also include a memory for storing data. In FIG. 4, the host system may use a ZFS file system, the processor 410 may be a CPU, and the near memory processing device 420 may be a CMM-DC device.

According to an embodiment of the disclosure, the calculation of metadata in the ZFS file system may be divided into a first mode and a second mode. According to an embodiment, the first mode may include non-memory access intensive calculation, and the second mode may include memory access intensive calculation. According to an embodiment, the non-memory access intensive calculation does not involve frequent memory access and all data exchange occurs between the host and the memory. On the other hand, the memory access intensive calculation may have the following characteristics, including but not limited to, frequent data access, simple logic, repetitive "read-calculate" or "read-calculate-write" mode, and amount of the final required result data being relatively small. The memory access intensive calculation may be suitable for the near memory processing devices such as the CMM-DC device:

Referring to FIG. 4, the processor 410 may include a plurality of metadata management modules. However, the disclosure is not limited thereto, and as such, the processor 410 may include one or more other modules. The plurality of metadata management modules may include, but is not limited to, an index node (dnode) management module 411, a deduplication table (DDT) management module 412, and a space management module 413.

The dnode management module 411 may generate an indirect block parse request based on an instruction to read/write a first target data block, and transmit the indirect block parse request to the near memory processing device 420. According to an embodiment, the dnode management module 411 may generate a checksum update request based on an instruction to write the first target data block, and transmit the checksum update request to the near memory processing device 420. According to an embodiment, the dnode management module 411 may receive an address of the first target data block determined based on the indirect block parse request from the near memory processing device 420, and/or receive a result of calculating a checksum of the first target data block based on the checksum update request from the near memory processing device 420.

According to an embodiment, the DDT management module 412 may generate a deduplication table query request based on an instruction to read/write a second target data block, and transmit the deduplication table query request to the near memory processing device 420. According to an embodiment, the DDT management module 412 may further receive a result of determining whether the second target data block exists in the near memory processing device based on the deduplication table query request from the near memory processing device 420.

According to an embodiment, the space management module 413 may generate a range tree query request based on an instruction to read/write a third target data block, and transmit the range tree query request to the near memory processing device 420. According to an embodiment, the space management module 413 may receive a range tree node (for example, a position and a corresponding value of the range tree node) determined based on the range tree query request from the near memory processing device 420.

According to an embodiment of the disclosure, each of the dnode management module 411, the DDT management module 412, and the space management module 413 may include a logical control unit, a non-memory access intensive algorithm unit, and a memory access intensive algorithm proxy unit.

For example, the dnode management module 411 may include, but is not limited to, a dnode control unit, a non-memory access intensive algorithm (NMI algorithm) unit, a parse proxy unit, and an update proxy unit. Here, the parse proxy unit and the update proxy unit belong to the memory access intensive algorithm proxy unit. The non-memory access intensive algorithm unit may perform various non-memory access intensive calculations related to dnode/indirect blocks. The dnode control unit may control the parse proxy unit to generate the indirect block parse request, and transmit the indirect block parse request to the near memory processing device 420, based on the instruction to read/write the first target data block. In addition, the dnode control unit may control the update proxy unit to generate the checksum update request, and transmit the checksum update request to the near memory processing device 420, based on the instruction to write the first target data block.

The DDT management module 412 may, but is not limited to, include a DDT control unit, a non-memory access intensive algorithm (NMI algorithm) unit, and a search proxy unit as the memory access intensive algorithm proxy unit. The non-memory access intensive algorithm unit may perform various non-memory access intensive calculations related to a DDT. The DDT control unit may control the search proxy unit to generate the deduplication table query request, and transmit the deduplication table query request to the near memory processing device 420, based on the instruction to read/write the second target data block.

The space management module 413 may include, but is not limited to, a space control unit, a non-memory access intensive algorithm (NMI algorithm) unit, and a traverse proxy unit as the memory access intensive algorithm proxy unit. The non-memory access intensive algorithm unit may perform various non-memory access intensive calculations related to a space map. The space control unit may control the traverse proxy unit to generate the range tree query request, and transmit the range tree query request to the near memory processing device 420, based on the instruction to read/write the third target data block.

Return to referring to FIG. 4, the near memory processing device 420 may include a calculation core 421 and a memory 422. However, the disclosure is not limited thereto, and as such, according to an embodiment, the near memory processing device 420 may include one or more other components. The memory 422 may store ZFS file system metadata. As described above, the ZFS file system metadata may include an index node (dnode), a deduplication table (DDT) and a space map. The index node metadata may be linked to various data blocks through multi-level indirect blocks in the memory. In addition, a range tree may be generated in the memory based on the space map metadata.

The calculation core 421 may include a plurality of calculation cores. The plurality of calculation cores may include, but is not limited to, a block trace core 4211, a deduplication table search core 4212, and a tree traverse core 4213. The block trace core 4211 may determine the address of the first target data block from the memory 422 based on receiving the indirect block parse request from the processor 410, and calculate the checksum of the second target data block and write the calculated checksum to the memory 422 based on receiving the checksum update request from the processor 410. The deduplication table search core 4212 may perform deduplication table search processing to determine whether the third target data block exists in the memory 422 based on receiving the deduplication table query request from the processor 410. The tree traverse core 4213 may traverse the range tree in the memory 422 to determine a target node corresponding to the range tree query request based on receiving the range tree query request from the processor 410.

The block trace core 4211 may include a trace control unit, an indirect block parse unit and a checksum calculation unit. The trace control unit may be referred to as a block trace control unit. The block trace control unit is responsible for data interaction with the processor 410 and controls operations of the block trace core 4211. According to an embodiment, based on receiving the indirect block parse request from the processor 410, the block trace core 4211 may load a block pointer pointing to a corresponding block in a next level indirect block starting from the Nth level indirect block to the first level indirect block, based on an ID of the first target data block. The block trace core 4211 may determine the address of the first target data block from the block pointer of the corresponding block in the first level indirect block, and return the address of the first target data block to the processor 410. According to an embodiment of the disclosure, the indirect block parse request is generated based on reading/writing the first target data block and includes the ID of the first target data block. The operation of loading the block pointer and determining the address of the first target data block described above may be performed through the indirect block parse unit.

According to an embodiment, the block trace core 4211 may load the second target data block from the memory based on receiving the checksum update request from the processor. The block trace core 4211 may calculate the checksum of the second target data block and write the calculated checksum to an indirect block stored in the memory. According to an embodiment of the disclosure, the checksum update request is generated based on writing the second target data block. The operations of loading the second target data block, calculating, and writing the checksum described above may be performed through the checksum calculation unit.

Figure 5:
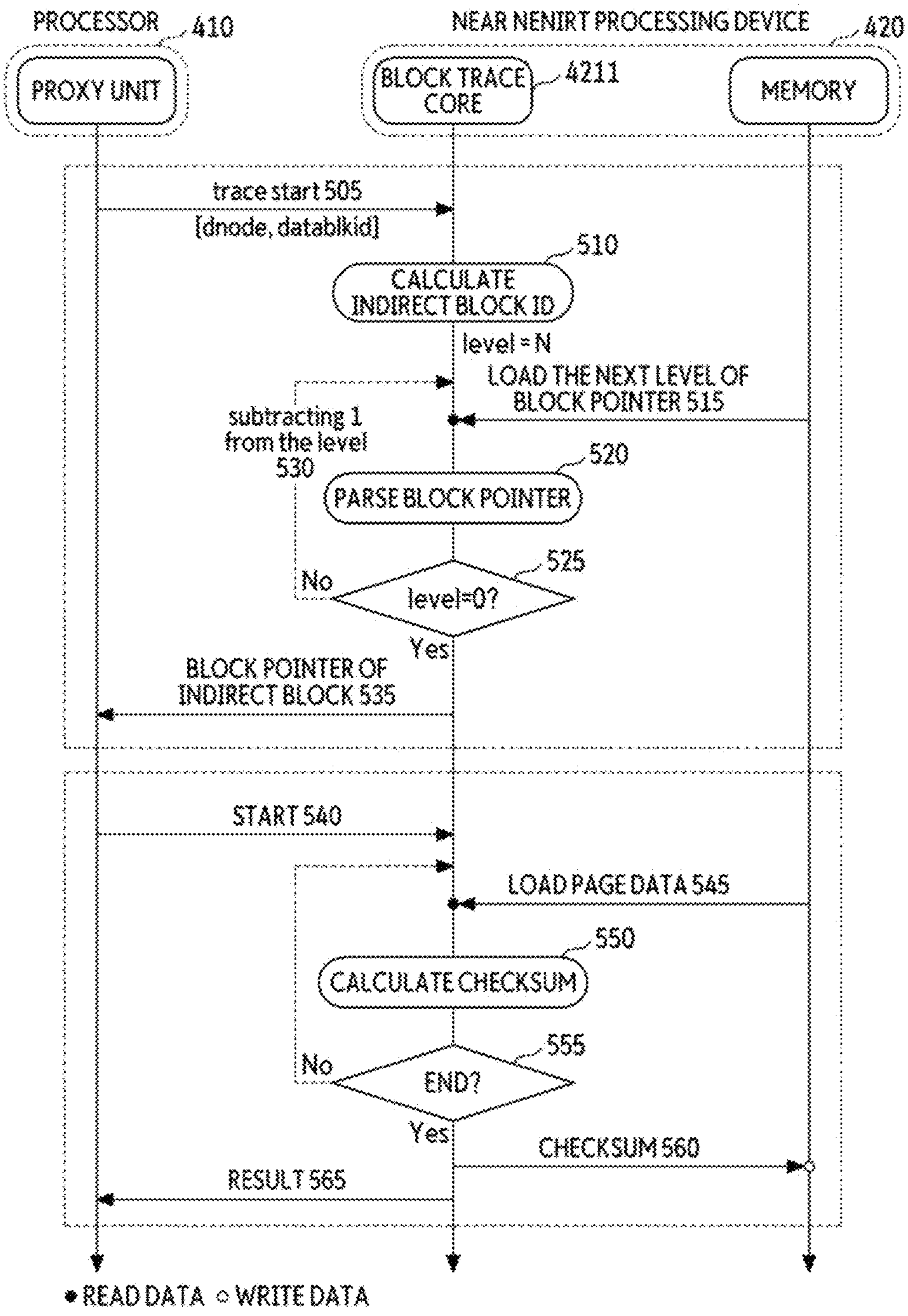
FIG. 5 is a diagram illustrating an example of a processing flow of block tracing and checksum according to an embodiment of the disclosure.

FIG. 5 is a diagram illustrating an example of a processing flow of block tracing and checksum according to an embodiment of the disclosure.

Referring to FIG. 5, based on receiving the indirect block parse request from the parse proxy unit, the block trace core 4211 may perform a block trace operation. The indirect block parse request (505) may include a block trace start instruction, an address of the dnode, and the ID of the first target data block (datablk id). The block trace core 4211 (e.g., the indirect block parse unit) may perform operations including calculating an ID of an indirect block (510), loading the block pointer pointing to the corresponding block in the next level indirect block from the memory 422 based on the calculated ID of the indirect block (515), parsing the loaded block pointer (520), and determining whether a level of a current indirect block is zero (525). According to an embodiment, based on a determination that the level of the current indirect block is not zero, subtracting 1 from the level (530) and returning to the operation of calculating the ID of the indirect block (510). According to an embodiment, based on a determination that the level of the current indirect block is zero, returning the address in the parsed block pointer to the parse proxy unit (535). According to an embodiment, operations 520 to 570 may be repeated starting from the Nth level indirect block based on the ID of the first target data block.

Further referring to FIG. 5, based on receiving the checksum update request from the update proxy unit, the block trace core 4211 may perform checksum calculation. The checksum update request may include a start instruction (540). The block trace core 4211 (e.g., the checksum calculation unit) may load page data from the memory (545) and calculate the checksum of the second target data block (550). Here, the page data may include a plurality of data blocks, and the plurality of data blocks may include at least one second target data block. In the case of a plurality of second target data blocks, it may be determined whether a current second target data block is the last second target data block (555). Based on a determination that the current second target data block is not the last second target data block, the process returns to the operation of calculating the checksum of the second target data block to calculate the checksum of a next second target data block. Based on a determination that the current second target data block is the last second target data block, the calculated checksum of all second target data blocks are written to the memory (560). For example, the calculated checksum of all second target data blocks are written to the corresponding indirect blocks). According to an embodiment, a results of the checksum calculation may be output to the processor 410 (565).

Referring back to FIG. 4, the deduplication table search core 4212 may include, but is not limited to, a deduplication table search control unit, a hash calculation unit, a parse calculation unit, and a comparison calculation unit. The deduplication table search control unit is responsible for data interaction with the processor 410 and controls the operation of the deduplication table search core 4212.

Figure 6:
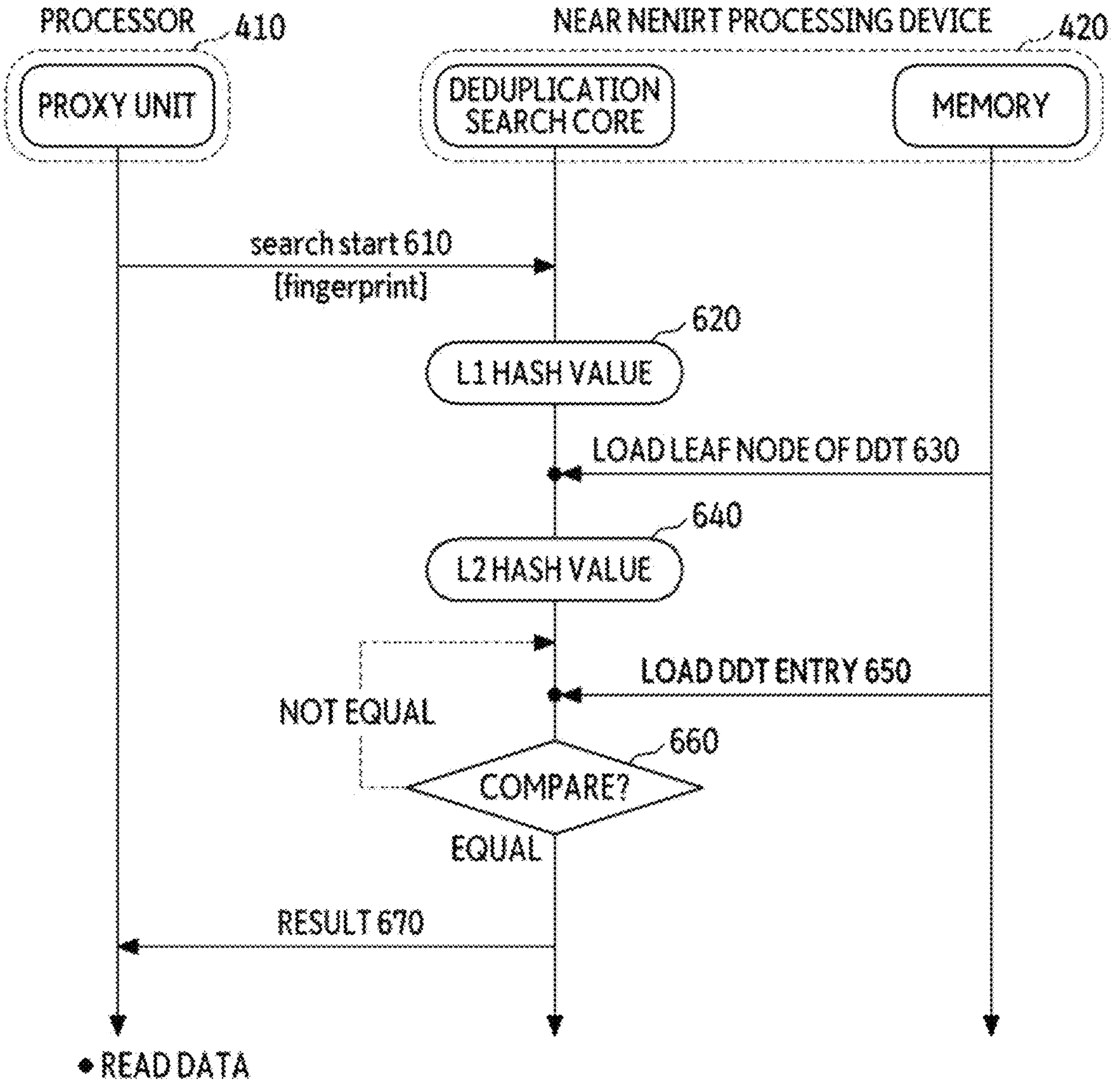
FIG. 6 is a diagram illustrating an example of a deduplication table search flow of an embodiment according to the disclosure.

FIG. 6 is a diagram illustrating an example of a deduplication table search flow according to an embodiment of the disclosure.

Referring to FIGS. 4 and 6, the deduplication table search flow process may include receiving a deduplication table query request from the processor (e.g., the search proxy unit) (610). According to of the disclosure, the deduplication table query request may be generated based on reading/writing the third target data block. The deduplication table query request may include a start instruction and the fingerprint of the third target data block, and the first level hash value may be calculated through the hash calculation unit of the deduplication table search core 4212. According to an embodiment, the deduplication table search core 4212 may calculate a first level hash value (620). For example, the deduplication table search core 4212 may calculate the first level hash value based on a fingerprint of a third target data block based on receiving the deduplication table query request from the processor (e.g., the search proxy unit). According to an embodiment, the deduplication table search core 4212 may load a deduplication table leaf node from the memory based on the first level hash value (L1 hash value) (630). The parse calculation unit of the deduplication table search core 4212 may parse a structure of the DDT to load the DDT leaf node. According to an embodiment, the deduplication table search core 4212 may further calculate a second level hash value (L2 hash value) based on the fingerprint of the third target data block (640)). Similarly, the second level hash value may be calculated through the hash calculation unit the deduplication table search core 4212. The deduplication table search core 4212 may load a deduplication table entry from the memory based on the second level hash value and the loaded deduplication table leaf node (650). Similarly, the DDT entry may be loaded through the parse calculation unit. Based on the fingerprint of the third target data block being equal to a key value of the loaded deduplication table entry, the deduplication table search core 4212 may determine that the third target data block is stored in the memory. Otherwise, the deduplication table search core 4212 may determine that the third target data block is not stored in the memory. According to an embodiment, the comparison calculation unit of the deduplication table search core 4212 may compare the fingerprint of the third target data block with the key value of the loaded deduplication table entry (660). The deduplication table search control unit may return a result indicating whether the third target data block is stored in the memory to the search proxy unit (670). For example, based on a determination that the fingerprint of the third target data block matches (e.g., equals) the key value of the loaded deduplication table entry, the deduplication table search control unit may return a result indicating whether the third target data block is stored in the memory to the search proxy unit. On the other hand, based on a determination that the fingerprint of the third target data block does not match (e.g., does not equal) the key value of the loaded deduplication table entry, the deduplication table search control unit may repeat operation (650).

Referring back to FIG. 4, the tree traverse core 4213 may include, but is not limited to, a traverse control unit, a comparison calculation unit and a position calculation unit. The traverse control unit is responsible for data interaction with the processor 410 and controls the operation of the tree traverse core 4213.

Figure 7:
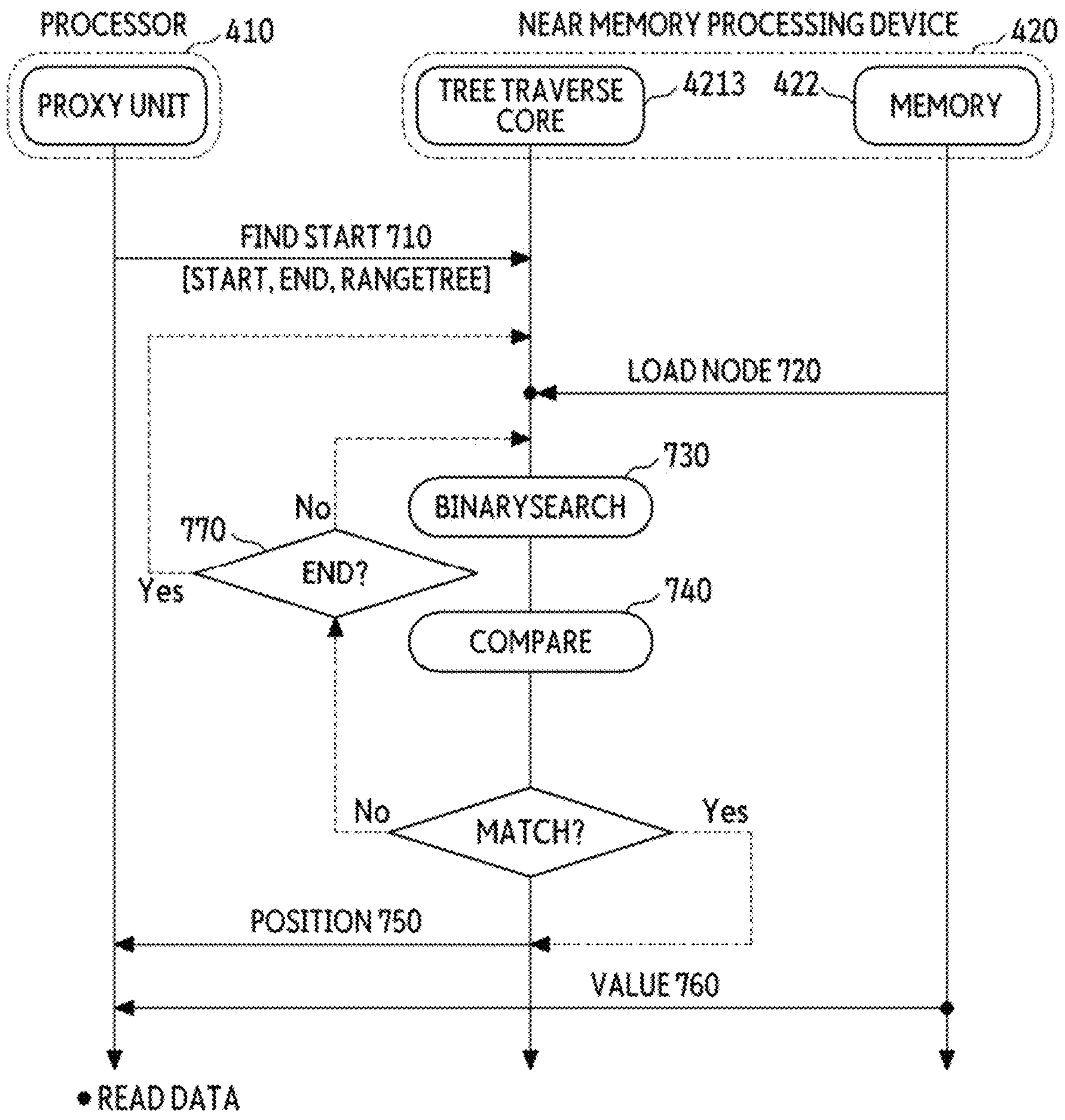
FIG. 7 is a diagram illustrating an example of a range tree search flow according to an embodiment of the disclosure.

FIG. 7 is a diagram illustrating an example of a range tree search flow according to an embodiment of the disclosure.

Referring to FIGS. 4 and 7, according to an embodiment of the disclosure, the range tree search flow process may include receiving the range tree query request from the processor (e.g., the traverse proxy unit) (710). The range tree query request may be generated based on reading/writing data. The range tree query request may include a find start instruction, start and end addresses of a query space, and a range tree address. According to an embodiment, the tree traverse core 4213 may read (e.g., load) a current range tree node from the memory based on the range tree query request (720). The tree traverse core 4213 may perform binary search according to the start and end addresses of the space targeted by the range tree query request based on the read current range tree node (730). For example, the binary search may be performed by the position calculation unit of the tree traverse core 4213. According to an embodiment, the range tree node found through the binary search may be compared with the start and end addresses of the query space included in the range tree query request by the comparison calculation unit of the tree traverse core 4213 to determine whether the found range tree node is the range tree node corresponding to the range tree query request (740). According to an embodiment, based on a match (Y) between the found range tree node and the range tree node corresponding to the range tree query request, the tree traverse core 4213 may determine the found range tree node as the target node corresponding to the range tree query request. In this case, the traverse control unit may return the found range tree node corresponding to the range tree query request to the traverse proxy unit. For example, the position (750) and the value of the range tree node (760) may be returned to the traverse proxy unit. On the other hand, based on a determination that the found range tree node does not match the range tree node corresponding to the range tree query request (N), the tree traverse core 4213 may read a next range tree node from the memory, use the read next range tree node as the current range tree node, and return to perform the operation of the binary search. However, in an example case in which the tree traverse core 4213 determinates that the current range tree node is the last range tree node (e.g., no more range tree node to load), the tree traverse core 4213 may end the process (770).

As described above, more metadata can be cached, a cache hit rate of the metadata can be improved and IO operations for loading the metadata from a storage device can reduced by expanding memory capacity using the near memory processing device. Meanwhile, it is possible to reduce a large amount of data interaction between a CPU and the memory by offloading memory access intensive calculation to the near memory processing device.

Figure 8:
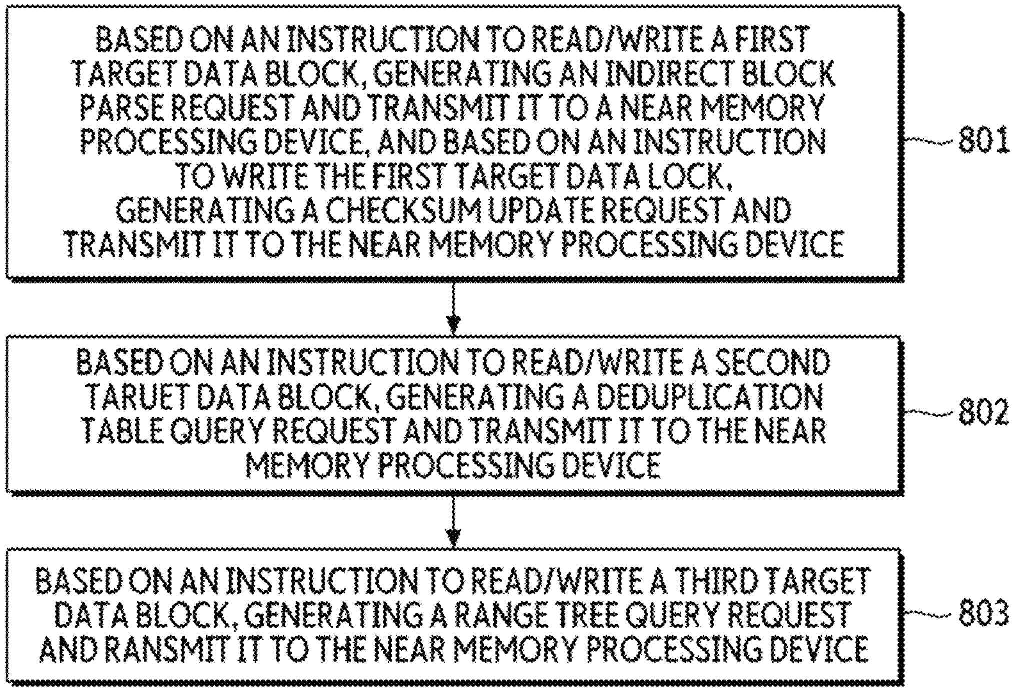
FIG. 8 is a flow diagram illustrating a data processing method executed by a processor according to an embodiment of the disclosure.

FIG. 8 is a flow diagram illustrating a data processing method executed by a processor according to an embodiment of the disclosure. Here, the processor may be the processor described with reference to FIGS. 4-7.

Referring to FIG. 8, in operation S801, an indirect block parse request may be generated based on an instruction to read/write a first target data block, and transmitted to a near memory processing device, and a checksum update request may be generated based on an instruction to write the first target data block, and transmitted to the near memory processing device.

In operation S802, a deduplication table query request may be generated based on an instruction to read/write a second target data block, and transmitted to the near memory processing device.

In operation S803, a range tree query request may be generated based on an instruction to read/write a third target data block, and transmitted to the near memory processing device.

According to an embodiment, the data processing method executed by the processor may further include receiving an address of the first target data block determined based on the indirect block parse request from the near memory processing device, and/or receiving a result of calculating a checksum of the first target data block based on the checksum update request from the near memory processing device, receiving a result of determining whether the second target data block exists in the near memory processing device based on the deduplication table query request from the near memory processing device, and receiving a range tree node determined based on a range tree query request from the near memory processing device.

Figure 9:
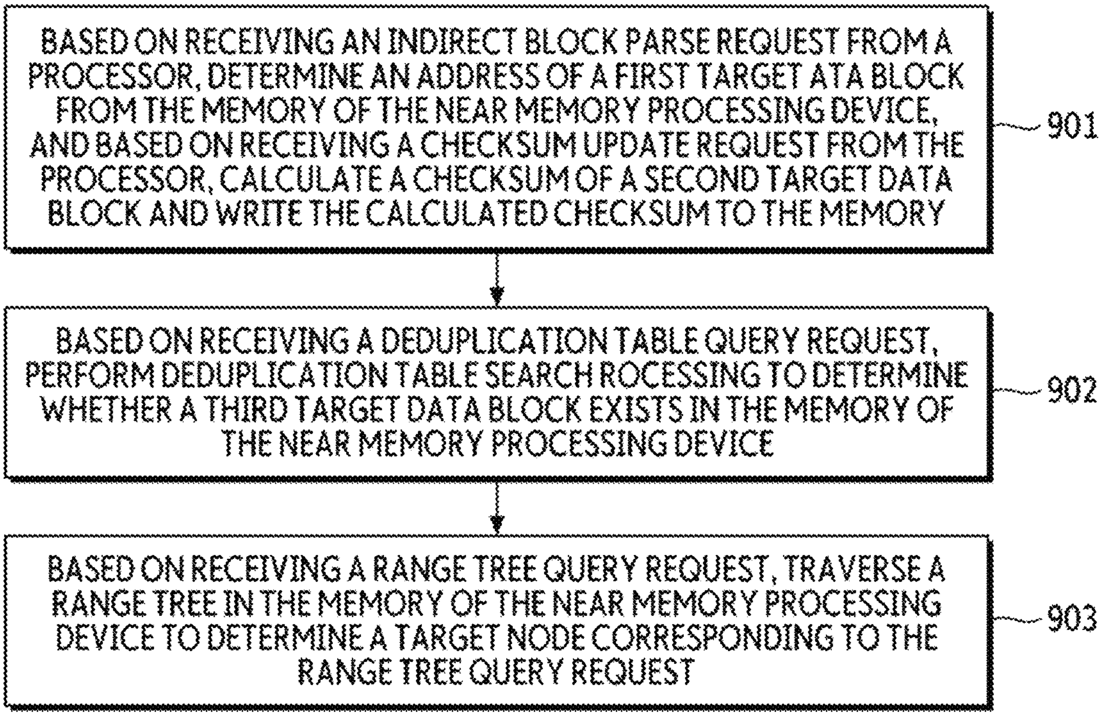
FIG. 9 is a flow diagram illustrating a data processing method executed in a near memory processing device according to an embodiment of the disclosure.

FIG. 9 is a flow diagram illustrating a data processing method executed in a near memory processing device according to an embodiment of the disclosure. Here, the near memory processing device may be the memory processing device described with reference to FIGS. 4-7.

Referring to FIG. 9, in operation S901, an address of a first target data block may be determined from a memory of the near memory processing device based on receiving an indirect block parse request from a processor, and a checksum of a second target data block is calculated and the calculated checksum is written to the memory based on receiving a checksum update request from the processor.

In operation S902, deduplication table search processing may be performed based on receiving a deduplication table query request from the processor to determine whether a third target data block exists in the memory of the near memory processing device.

In operation S903, a range tree in the memory of the near memory processing device may be traversed based on receiving a range tree query request from the processor to determine a target node corresponding to the range tree query request.

According an embodiment of the disclosure, the memory of the near memory processing device stores metadata of a ZFS file system, and the metadata of the ZFS file system includes an index node (dnode), a deduplication table (DDT) and a space map. The index node metadata may be linked to various data blocks through multi-level indirect blocks in the memory of the near memory processing device. In addition, the range tree may be generated in the memory of the near memory processing device based on the space map metadata.

As illustrated in FIG. 1, the multi-level indirect blocks include N-level indirect blocks, where N is an integer greater than 1. The i-th level indirect block, among the N-level indirect blocks, includes a plurality of blocks, where i is an integer greater than or equal to 1 and less than N. Each block in the j-th level indirect block, among the N-level indirect blocks, includes a block pointer pointing to a corresponding block in the j−1-th level indirect block, in which an address and a checksum of the corresponding block in the j−1-th level indirect block are included, where j is an integer greater than 1 and less than or equal to N. Each block in the first level indirect block includes a block pointer pointing to the data block, in which an address and a checksum of the data block are included.

According to an embodiment of the disclosure, operation S901 may include, based on receiving the indirect block parse request from the processor, loading a block pointer pointing to a corresponding block in a next level indirect block, starting from the Nth level indirect block, until the first level indirect block, based on an ID of the first target data block, and determining the address of the first target data block from the block pointer of the corresponding block in the first level indirect block, and returning the address of the first target data block to the processor, wherein the indirect block parse request is generated based on reading/writing the first target data block and includes the ID of the first target data block.

According to an embodiment, operation S901 may further include based on receiving the checksum update request from the processor, loading the second target data block from the memory of the near memory processing device, and calculating the checksum of the second target data block and writing the calculated checksum to an indirect block stored in the memory of the near memory processing device, wherein the checksum update request is generated based on writing to the first target data block.

According to an embodiment of the disclosure, operation S902 may include based on receiving the deduplication table query request from the processor, calculating a first level hash value based on a fingerprint of the third target data block, based on the first level hash value, loading a leaf node of the deduplication table from the memory of the near memory processing device, calculating a second level hash value based on the fingerprint of the third target data block, based on the second level hash value and the loaded leaf node of the deduplication table, loading a deduplication table entry from the memory of the near memory processing device, and based on the fingerprint of the third target data block being equal to a key value of the loaded deduplication table entry, determining that the third target data block is stored in the memory of the near memory processing device, wherein the deduplication table query request is generated based on reading/writing the third target data block.

According to an embodiment of the disclosure, operation S903 may include based on receiving the range tree query request from the processor, reading a current range tree node from the memory of the near memory processing device, based on the read current range tree node, performing binary search according to start and end addresses of space targeted by the range tree query request, based on finding a range tree node corresponding to the range tree query request through the binary search, determining the found range tree node as the target node corresponding to the range tree query request, and based on not finding the range tree node corresponding to the range tree query request through the binary search, reading a next range tree node from the memory of the near memory processing device, using the read next range tree node as the current range tree node, and returning to the operation of performing the binary search, wherein the range tree query request is generated based on reading/writing data.

According to the near memory processing device, the processor, and the data processing method of the embodiments of the disclosure, more metadata can be cached, a cache hit rate of the metadata can be improved and IO operations for loading the metadata from a storage device can be reduced by expanding the memory capacity using the near memory processing device (e.g., a CMM-DC device). Meanwhile, it is possible to reduce a large amount of data interaction between the CPU and the memory by offloading memory access intensive calculation to the near memory processing device. In addition, according to the near memory processing device, the processor, and the data processing method of the embodiments of the disclosure, a solution for improving metadata management for PB level large capacity storage can be provided, thereby enhancing execution efficiency of the ZFS file system.

Table 2 shows an example of comparing the number of times of the storage device IOs of a comparative example with that of the storage device IOs of an example embodiment of the disclosure. For example, the comparative example may be based on a related art technique.

TABLE 2

| Meta-data type | Operation | Number of times of IOs: Comparative Example | Number of times of IOs: Example Embodiment |
|---|---|---|---|
| dnode | R/W (read/write ) | N = dnode level number | IOs reduce by $\left(1 - \frac{\text{memory size}}{CMM\ \text{size} + \text{memory size}}\right)\%$ |
| DDT | R/W (read/write ) | [1, DDT size/ block size] | |
| space map | R/W (read/write ) | [1, space map size/block size] | |

In Table 2, the memory size indicates a storage size (e.g., a memory size) of the host system, and the CMM size indicates a size of the near memory processing device.

Table 3 shows an example of comparing the number of times of the memory access intensive calculations of a comparative example with that of the memory access intensive calculations according to an example embodiment of the disclosure. For example, the comparative example may be based on a related art technique.

TABLE 3

| Metadata type | Operation | Calculation type | Number of times of the memory access intensive calculations: Comparative Example | Number of times of the memory access intensive calculations: Example Embodiment |
|---|---|---|---|---|
| dnode | R/W (read/write) | Parse block pointer | N + 1 | 1 |
| | W (write ) | Checksum | N * (block size/ page size) | 0 |
| DDT | R/W (read/write) | Compare | [1, entry number] | 0 |
| space map | R/W (read/write) | Position calculation Compare | Log(entry number) * range tree height | 1 |

The data processing method executed in the near memory processing device and the data processing method executed in the processor according to the embodiments of the disclosure may be written as a computer program and stored on a computer-readable storage medium. In an example case, in which, the computer program is executed by a processor, the data processing method as described above is implemented. Examples of the computer-readable storage medium include: read only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid-state drive (SSD), card type storage (such as multimedia cards, secure digital (SD) cards, or ultra fast digital (XD) cards), magnetic tape, floppy disk, magneto-optical data storage device, optical data storage device, hard disk, solid-state disk and any other device, and any other device configured to store computer programs and any associated data, data files and data structures in a non-temporary manner and provide the computer programs and any associated data, data files, and data structures to the processor or computer so that the processor or computer can execute the computer programs. In one example, computer programs and any associated data, data files, and data structures are distributed across a networked computer system, allowing the computer programs and any associated data, data files, and data structures to be stored, accessed, and executed in a distributed manner through one or more processors or computers.

Although the disclosure includes specific examples, an ordinary person skilled in the art will understand that various modifications can be made in form and detail without departing from the spirit and scope of the claims and their equivalents. The examples the disclosure will be considered descriptive rather than restrictive. The description of features or aspects in each example will be considered applicable to similar features or aspects in other examples. If the described techniques are executed in different orders, and/or if the described systems, structures, devices, or circuits are combined and/or replaced or supplemented by other components or their equivalents in different ways, appropriate results can be obtained. Therefore, the scope of disclosure is not limited by detailed descriptions, but by the claims and their equivalents, and all modifications within the scope of the claims and their equivalents will be deemed to be included in the disclosure.

What is claimed is:

1. A near memory processing device, comprising:

a memory; and a calculation core comprising:

a block trace core configured to receive, from a processor external to the near memory processing device, an indirect block parse request and a checksum update request, determine an address of a first target data block from the memory based on the indirect block parse request, and calculate a checksum of a second target data block and write the calculated checksum to the memory based on the checksum update request;

a deduplication table search core configured to receive, from the processor, a deduplication table query request, and perform deduplication table search processing based on the deduplication table query request to determine whether a third target data block exists in the memory; and a tree traverse core configured to receive, from the processor, a range tree query request, and traverse a range tree in the memory based on the range tree query request to determine a target node corresponding to the range tree query request.

2. The near memory processing device of claim 1, wherein the memory stores metadata of a ZFS file system, and the metadata of the ZFS file system comprises an index node (dnode), a deduplication table (DDT) and a space map, wherein the index node is linked to a plurality of data blocks through multi-level indirect blocks in the memory, wherein the range tree is generated in the memory based on the space map.

3. The near memory processing device of claim 2, wherein the multi-level indirect blocks comprise N-level indirect blocks, where Nis an integer greater than 1, and a i-th level indirect block, among the N-level indirect blocks, comprises a plurality of blocks, where i is an integer greater than or equal to 1 and less than N, each block in a j-th level indirect block, among the N-level indirect blocks, comprises a block pointer pointing to a corresponding block in a j−1-th level indirect block, which comprises an address and a checksum of the corresponding block in the j−1-th level indirect block, where j is an integer greater than 1 and less than or equal to N, each block in a first level indirect block, among the N-level indirect blocks, comprises a block pointer pointing to a data block, which comprises an address and a checksum of the data block.

4. The near memory processing device of claim 3, wherein the block trace core is configured to:

based on receiving the indirect block parse request from the processor, load the block pointer pointing to a corresponding block in a next level indirect block, starting from the Nth level indirect block to the first level indirect block, among the N-level indirect blocks, based on an ID of the first target data block; and determine the address of the first target data block from the block pointer of the corresponding block in the first level indirect block, and return the address of the first target data block to the processor, wherein the indirect block parse request is generated based on an operation for reading or writing the first target data block, and wherein the indirect block parse request comprises the ID of the first target data block.

5. The near memory processing device of claim 3, wherein the block trace core is configured to:

based on receiving the checksum update request from the processor, load the second target data block from the memory; and calculate the checksum of the second target data block and write the calculated checksum to an indirect block stored in the memory, wherein the checksum update request is generated based on writing the second target data block.

6. The near memory processing device of claim 2, wherein the deduplication table search core is configured to:

based on receiving the deduplication table query request from the processor, calculate a first level hash value based on a fingerprint of the third target data block;

based on the first level hash value, load a leaf node of the deduplication table from the memory;

calculate a second level hash value based on the fingerprint of the third target data block;

based on the second level hash value and the loaded leaf node of the deduplication table, load a deduplication table entry from the memory; and based on the fingerprint of the third target data block being equal to a key value of the loaded deduplication table entry, determine that the third target data block is stored in the memory, wherein the deduplication table query request is generated based on an operation for reading or writing the third target data block.

7. The near memory processing device of claim 2, wherein the block trace core is configured to:

based on receiving the range tree query request from the processor, read a current range tree node from the memory;

based on the read current range tree node, perform binary search according to start and end addresses of space targeted by the range tree query request;

based on finding a range tree node corresponding to the range tree query request through the binary search, determine the found range tree node as the target node corresponding to the range tree query request; and based on not finding the range tree node corresponding to the range tree query request through the binary search, read a next range tree node from the memory, use the read next range tree node as the current range tree node, and return to the operation of performing the binary search, wherein the range tree query request is generated based on an operation for reading or writing data.

8. A data processing method executed in a near memory processing device, comprising:

receiving, from a processor external to the near memory processing device, an indirect block parse request and a checksum update request, determining an address of a first target data block from a memory based on the indirect block parse request, and calculating a checksum of a second target data block and writing the calculated checksum to the memory based on the checksum update request;

receiving, from the processor, a deduplication table query request, and performing deduplication table search processing based on the deduplication table query request to determine whether a third target data block exists in the memory; and receiving, from the processor, a range tree query request, and traversing a range tree in the memory based on the range tree query request to determine a target node corresponding to the range tree query request.

9. The data processing method of claim 8, wherein the memory stores metadata of a ZFS file system, and the metadata of the ZFS file system comprises an index node (dnode), a deduplication table (DDT) and a space map, wherein the index node is linked to a plurality of data blocks through multi-level indirect blocks in the memory, and wherein the range tree is generated in the memory based on the space map.

10. The data processing method of claim 9, wherein the multi-level indirect blocks comprise N-level indirect blocks, where N is an integer greater than 1, and a i-th level indirect block, among the N-level indirect blocks, comprises a plurality of blocks, where i is an integer greater than or equal to 1 and less than N, each block in a j-th level indirect block, among the N-level indirect blocks, comprises a block pointer pointing to a corresponding block in a j−1-the level indirect block, which comprises an address and a checksum of the corresponding block in the j−1-th level indirect block, where j is an integer greater than 1 and less than or equal to N, each block in a first level indirect block, among the N-level indirect blocks, comprises a block pointer pointing to a data block, which comprises an address and a checksum of the data block.

11. The data processing method of claim 10, wherein the determining of an address of a first target data block comprises:

based on receiving the indirect block parse request from the processor, loading a block pointer pointing to a corresponding block in a next level, starting from the Nth level indirect block to the first level indirect block, among the N-level indirect blocks, based on an ID of the first target data block; and determining the address of the first target data block from the block pointer of the corresponding block in the first level indirect block, and returning the address of the first target data block to the processor, wherein the indirect block parse request is generated based on an operation for reading or writing the first target data block, and wherein the indirect block parse request comprises the ID of the first target data block.

12. The data processing method of claim 10, wherein the calculating of a checksum of a second target data block comprises:

based on receiving the checksum update request from the processor, loading the second target data block from the memory; and calculating the checksum of the second target data block and writing the calculated checksum to an indirect block stored in the memory, wherein the checksum update request is generated based on writing the first target data block.

13. The data processing method of claim 9, wherein the performing of deduplication table search processing to determine whether the third target data block exists in the memory comprises:

based on receiving the deduplication table query request from the processor, calculating a first level hash value based on a fingerprint of the third target data block;

based on the first level hash value, loading a leaf node of the deduplication table from the memory;

calculating a second level hash value based on the fingerprint of the third target data block;

based on the second level hash value and the loaded leaf node of the deduplication table, loading a deduplication table entry from the memory; and based on the fingerprint of the third target data block being equal to a key value of the loaded deduplication table entry, determining that the third target data block is stored in the memory, wherein the deduplication table query request is generated based on an operation for reading or writing the third target data block.

14. The data processing method of claim 9, wherein the traversing of a range tree in the memory to determine a target node corresponding to the range tree query request comprises:

based on receiving the range tree query request from the processor, reading a current range tree node from the memory;

based on the read current range tree node, performing binary search according to start and end addresses of space targeted by the range tree query request;

based on finding a range tree node corresponding to the range tree query request through the binary search, determining the found range tree node as the target node corresponding to the range tree query request; and based on not finding the range tree node corresponding to the range tree query request through the binary search, reading a next range tree node from the memory, using the read next range tree node as the current range tree node, and returning to the operation of performing the binary search, wherein the range tree query request is generated based on an operation for reading or writing data.

15. A host system comprising:

a processor; and a near memory processing device, wherein the processor is configured to:

generate an indirect block parse request based on an instruction to read or write a first target data block, and transmit the indirect block parse request to a near memory processing device, generate a checksum update request based on an instruction to write a second target data block, and transmit the checksum update request to the near memory processing device, generate a deduplication table query request based on an instruction to read or write a third target data block, and transmit the deduplication table query request to the near memory processing device, and generate a range tree query request based on an instruction to read or write data, and transmit the range tree query request to the near memory processing device, and wherein the near memory processing device comprising:

a memory, and a calculation core comprising:

a block trace core configured to receive, from the processor external to the near memory processing device, the indirect block parse request and the checksum update request, determine an address of a first target data block from the memory based on the indirect block parse request, and calculate a checksum of a second target data block and write the calculated checksum to the memory based on the checksum update request, a deduplication table search core configured to receive, from the processor, the deduplication table query request, and perform deduplication table search processing based on the deduplication table query request to determine whether a third target data block exists in the memory, and a tree traverse core configured to receive, from the processor, the range tree query request, and traverse a range tree in the memory based on the range tree query request to determine a target node corresponding to the range tree query request.

16. The host system of claim 15, wherein the memory stores metadata of a ZFS file system, and the metadata of the ZFS file system comprises an index node (dnode), a deduplication table (DDT) and a space map, wherein the index node is linked to a plurality of data blocks through multi-level indirect blocks in the memory, wherein the range tree is generated in the memory based on the space map, wherein the multi-level indirect blocks comprise N-level indirect blocks, where Nis an integer greater than 1, and a i-th level indirect block, among the N-level indirect blocks, comprises a plurality of blocks, where i is an integer greater than or equal to 1 and less than N, each block in a j-th level indirect block, among the N-level indirect blocks, comprises a block pointer pointing to a corresponding block in a j−1-th level indirect block, which comprises an address and a checksum of the corresponding block in the j−1-th level indirect block, where j is an integer greater than 1 and less than or equal to N, each block in a first level indirect block, among the N-level indirect blocks, comprises a block pointer pointing to a data block, which comprises an address and a checksum of the data block.

17. The host system of claim 16, wherein the block trace core of the near memory processing device is configured to:

based on receiving the indirect block parse request from the processor, load the block pointer pointing to a corresponding block in a next level indirect block, starting from the Nth level indirect block to the first level indirect block, among the N-level indirect blocks, based on an ID of the first target data block; and determine the address of the first target data block from the block pointer of the corresponding block in the first level indirect block, and return the address of the first target data block to the processor, wherein the indirect block parse request is generated based on an operation for reading or writing the first target data block, and wherein the indirect block parse request comprises the ID of the first target data block.

18. The host system of claim 16, wherein the block trace core of the near memory processing device is configured to:

based on receiving the checksum update request from the processor, load the second target data block from the memory; and calculate the checksum of the second target data block and write the calculated checksum to an indirect block stored in the memory, wherein the checksum update request is generated based on writing the second target data block.

19. The host system of claim 16, wherein the deduplication table search core of the near memory processing device is configured to:

based on receiving the deduplication table query request from the processor, calculate a first level hash value based on a fingerprint of the third target data block;

based on the first level hash value, load a leaf node of the deduplication table from the memory;

calculate a second level hash value based on the fingerprint of the third target data block;

based on the second level hash value and the loaded leaf node of the deduplication table, load a deduplication table entry from the memory; and based on the fingerprint of the third target data block being equal to a key value of the loaded deduplication table entry, determine that the third target data block is stored in the memory, wherein the deduplication table query request is generated based on an operation for reading or writing the third target data block.

20. The host system of claim 16, wherein the block trace core of the near memory processing device is configured to:

based on receiving the range tree query request from the processor, read a current range tree node from the memory;

based on the read current range tree node, perform binary search according to start and end addresses of space targeted by the range tree query request;

based on finding a range tree node corresponding to the range tree query request through the binary search, determine the found range tree node as the target node corresponding to the range tree query request; and based on not finding the range tree node corresponding to the range tree query request through the binary search, read a next range tree node from the memory, use the read next range tree node as the current range tree node, and return to the operation of performing the binary search, wherein the range tree query request is generated based on an operation for reading or writing data.

* * * * *